(12) United States Patent
Pricone

(10) Patent No.: US 11,921,305 B2
(45) Date of Patent: *Mar. 5, 2024

(54) RETROREFLECTIVE TRAFFIC SIGN AND PROCESS AND APPARATUS FOR MANUFACTURING SAME

(71) Applicant: The Boeing Company, Arlington, VA (US)

(72) Inventor: Robert M. Pricone, Libertyville, IL (US)

(73) Assignee: The Boeing Company, Arlington, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/084,620

(22) Filed: Dec. 20, 2022

(65) Prior Publication Data

US 2023/0124223 A1  Apr. 20, 2023

Related U.S. Application Data

(63) Continuation of application No. 17/940,404, filed on Sep. 8, 2022, now Pat. No. 11,567,246.
(Continued)

(51) Int. Cl.
*G02B 5/12* (2006.01)
*G02B 5/124* (2006.01)

(52) U.S. Cl.
CPC .................. *G02B 5/124* (2013.01)

(58) Field of Classification Search
None
See application file for complete search history.

(56) References Cited

U.S. PATENT DOCUMENTS

| 4,478,769 A | 10/1984 | Pricone et al. |
| 4,486,363 A | 12/1984 | Pricone et al. |
(Continued)

FOREIGN PATENT DOCUMENTS

| CN | 1168724 A | 6/1996 |
| WO | 2017079392 A1 | 5/2017 |

OTHER PUBLICATIONS

Bostik; "Two Part Solvent Based Polyurethane Adhesive System"; www.bostik-us.com; Dec. 31, 2015.
(Continued)

*Primary Examiner* — Jennifer D. Carruth
(74) *Attorney, Agent, or Firm* — HANLEY, FLIGHT & ZIMMERMAN, LLC

(57) ABSTRACT

A retroreflective sign comprising a rigid substrate with a pattern of cell walls formed of a polyurethane adhesive or two-part polyurea adhesive, and a polymeric sheet having a front face and a rear face, the rear face facing the substrate, the rear face comprising microprismatic reflective elements is disclosed. The polymeric sheet is adhered directly to the cell walls formed of the polyurethane adhesive or two-part polyurea adhesive while leaving an air gap between the microprismatic retroreflective elements and the rigid substrate in the cells. A method of making the retroreflective sign includes applying a polyurethane adhesive or two-part polyurea adhesive to a front side of a rigid substrate in a pattern defining cell walls; and prior to full curing of the polyurethane adhesive, laminating the front side of the rigid substrate a rear side of a polymeric sheet via the cell walls, the polymeric sheet comprising microprismatic elements.

20 Claims, 5 Drawing Sheets

Related U.S. Application Data

(60) Provisional application No. 63/257,431, filed on Oct. 19, 2021, provisional application No. 63/242,928, filed on Sep. 10, 2021.

(56) References Cited

U.S. PATENT DOCUMENTS

| | | | |
|---|---|---|---|
| 4,601,861 | A | 7/1986 | Pricone et al. |
| 4,618,518 | A | 10/1986 | Pricone et al. |
| 5,213,872 | A | 5/1993 | Pricone et al. |
| 5,639,530 | A | 6/1997 | Miron et al. |
| 6,015,214 | A | 1/2000 | Heenan et al. |
| 6,568,817 | B1 | 5/2003 | Mimura et al. |
| 6,677,028 | B1 | 1/2004 | Lasch |
| 6,908,295 | B2 | 6/2005 | Thielman et al. |
| 10,031,266 | B2 | 7/2018 | Pricone |
| 10,838,118 | B2 | 11/2020 | Pricone |
| 11,567,246 | B1 * | 1/2023 | Pricone .................. G02B 5/124 |
| 2001/0026860 | A1 | 10/2001 | Benson et al. |
| 2003/0006005 | A1 | 1/2003 | Northey |
| 2004/0169928 | A1 | 9/2004 | Nilsen et al. |
| 2011/0193335 | A1 | 8/2011 | Budd et al. |
| 2012/0128940 | A1 | 5/2012 | Kamiyama |
| 2013/0114143 | A1 | 5/2013 | Thakkar et al. |
| 2015/0170797 | A1 | 6/2015 | Prerez-Sanchez et al. |
| 2016/0139306 | A1 | 5/2016 | Chatterjee et al. |
| 2018/0180778 | A1 * | 6/2018 | Pricone .................. B32B 15/18 |
| 2020/0257024 | A1 | 8/2020 | Abrams |

OTHER PUBLICATIONS

Lubrizol; "Pearlbond™ TPU (Thermoplastic Polyurethane)"; https://www.lubrizol.com/Engineered-Polymers/Products/Pearlbond-TPU; 2022.

Schweitzer Mauduit; "Netting"; https://www.swmintl.com/products/netting; 2022.

Schweitzer Mauduit; "An Introduction to How Plastic Netting is Made"; https://www.swmintl.com/products/netting/introduction-to-plastic-netting; 2022.

Semochkina I., "International Search Report and Written Opinion for PCT Patent Application No. PCT/US2016/060259", dated Mar. 23, 2017, 7 pages.

Carruth, Jennifer Doak, "Notice of Allowance and Fees Due for U.S. Appl. No. 15/739,632", dated May 18, 2018, 14 pages.

Carruth, Jennifer Doak, "Notice of Allowability for U.S. Appl. No. 15/739,632", dated Jun. 14, 2018, 11 pages.

Carruth, Jennifer Doak, "Notice of Allowability for U.S. Appl. No. 15/739,632", dated Jun. 26, 2018, 2 pages.

Mohri, Mineko, "International Preliminary Report o Patentability for PCT Patent Application No. PCT/US2016/060259", dated May 8, 2018, 5 pages.

Chinese National Intellectual Property Administration, "Office Action for Chinese Patent Application No. 201680078114.5", dated Feb. 27, 2020, 31 pages.

Notice of Allowance dated Nov. 2, 2022 in connection with U.S. Appl. No. 17/940,404.

* cited by examiner

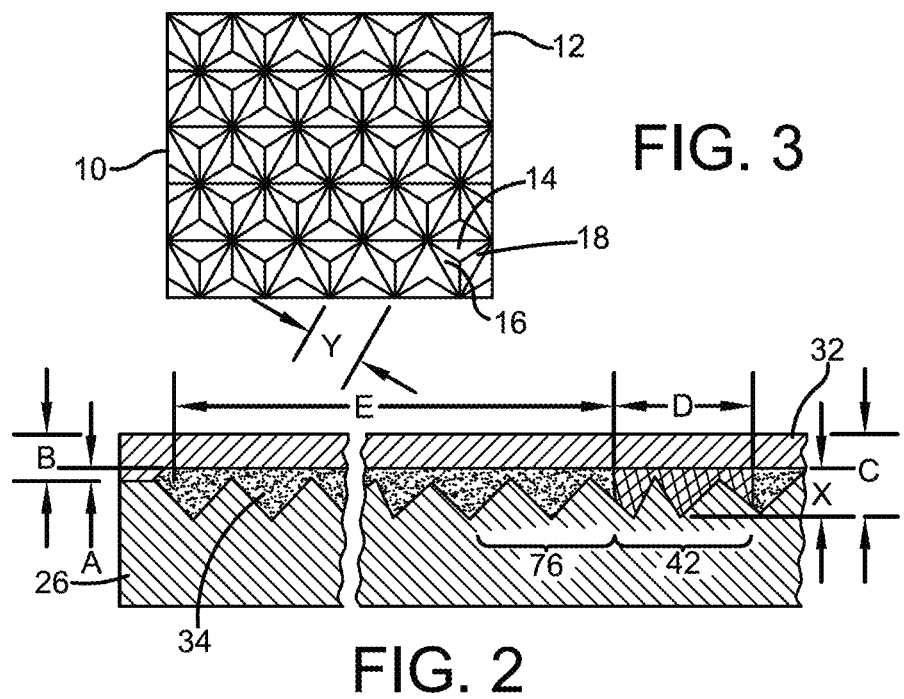
FIG. 3
FIG. 2
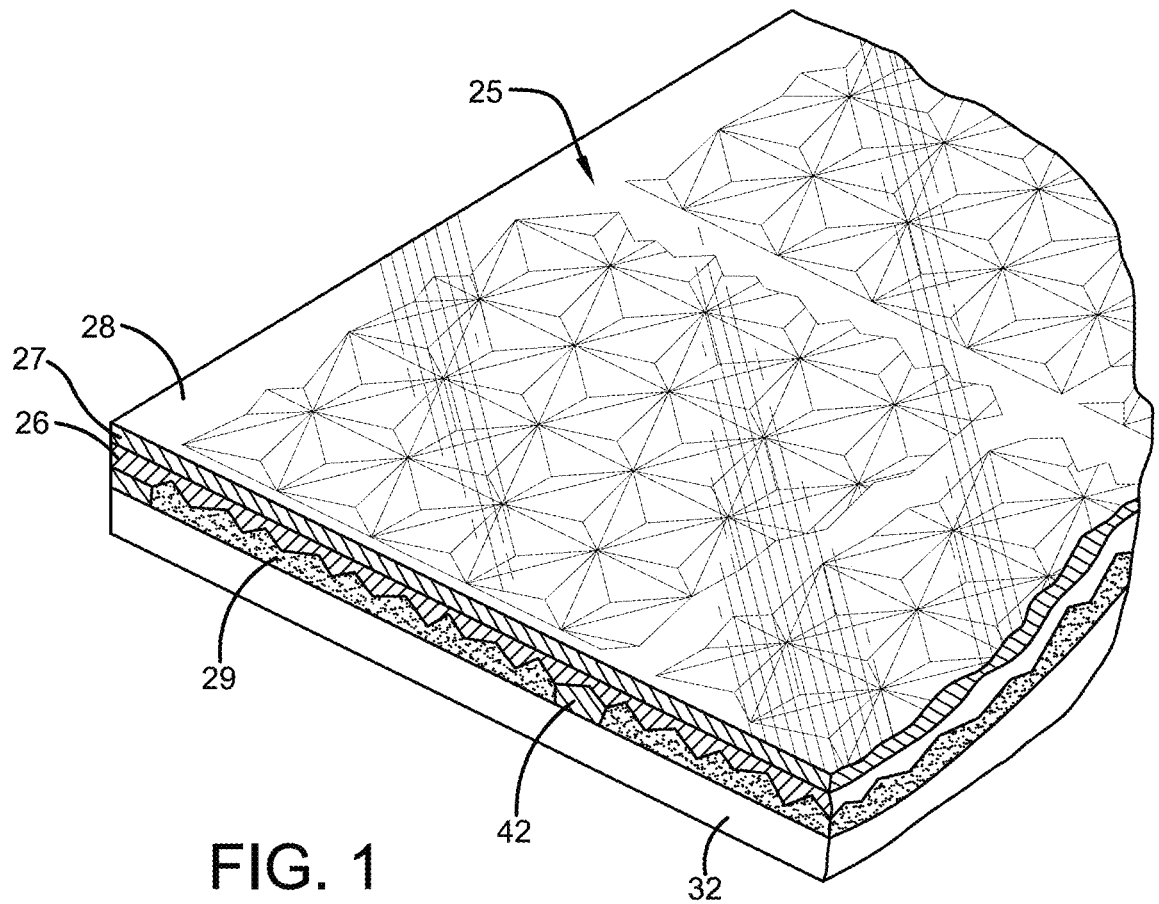
FIG. 1

RETROREFLECTIVE TRAFFIC SIGN AND PROCESS AND APPARATUS FOR MANUFACTURING SAME

CROSS-REFERENCE TO RELATED APPLICATIONS

This application is a continuation of U.S. patent application Ser. No. 17/940,404, filed on Sep. 8, 2022, which in turn claims the benefit of priority of U.S. Provisional Application 63/257,431, filed on Oct. 19, 2021 and the benefit of priority of U.S. Provisional Application 63/242,928, filed on Sep. 10, 2021. Each of these prior filed applications is incorporated herein by reference.

TECHNICAL FIELD

This application relates to a retroreflective traffic sign and process and apparatus for directly combining polymeric retroreflective microprismatic thin film to an aluminum backing to produce a finished traffic sign, and, more particularly, a process and apparatus for making traffic signs that are less expensive and just as functional as the current method of manufacturing such signs.

BACKGROUND

Processes and apparatus for embossing precision optical patterns, such as microcubes, or prisms, in a thin film resinous sheet or laminate, are known as referenced in U.S. Pat. Nos. 4,486,363; 4,478,769; 4,601,861; 5,213,872; 6,015,214, and more recently 6,908,295, the subject matter of which patents are all fully incorporated herein by reference. In the production of such synthetic resin optical sheeting film, highly precise embossing (generally exceeding the capabilities of current micromolding processing techniques for synthetic resins), is required because the geometric accuracy of the optical prismatic elements determines the film's optical performance. The above referenced patents disclose particular methods and apparatus for continuously embossing a repeating retro-reflective microprismatic pattern of fine or precise optical quality and detail on one surface of a transparent and thin thermoplastic film to form the surface of the film into the desired retroreflective microstructured pattern.

This application relates to significant improvements to the method and apparatus of prior patent, U.S. Pat. No. 4,618,518, issued Jun. 21, 1986, of which the current inventor is a named co-inventor thereof. This prior patent is incorporated herein by reference.

To manufacture current traffic signs, the thin retroreflective microprismatic pattern in thermoplastic film is then combined with a protective backing layer behind the microprismatic elements, and then there is applied an additional pressure sensitive adhesive and a release liner. Subsequently the release liner is removed and the adhesively backed film is then applied to an underlying aluminum or other material substrate. This combination of materials is known as reflective sheeting, in which the film is produced in rolls in various specified colors and then laminated to the aluminum or other material panels to produce the primary components for traffic signs. Lettering and symbols can be printed or laminated as film on the front film surface to provide text or other instructions to a driver. Prior to corner cube prisms, products such as those consisting of glass bead film, known as engineer grade, and high-intensity films have been used for decades. More recently the improved versions use micro prismatic optics formed on the reflective film, which is more efficient and capable of a diverse range of reflectivity that is beneficial to the driver at night. Nonetheless, the retroreflective sheeting products currently produced, as manufactured by numerous companies, are produced with the backing layer, the adhesive layer and the release liner and then shipped to sign shops that fabricate the signs where the film is then laminated to aluminum or other material panels using the pressure sensitive adhesive. This technique currently now is, and has been universally used for decades as the primary method of manufacturing retroreflective traffic signs. There are several companies that manufacture the retroreflective sheeting film and many companies that provide the aluminum panels. Sign makers purchase the reflective sheeting with the back layer, adhesive layer and release liner from one source and the aluminum panels are purchased from another source and then the sign shops combine the two components.

Applicant's prior U.S. Pat. No. 10,031,266 discloses direct application of reflective sheeting to an underlying substrate. However, a need still exists for improvements in the bonding of the reflective sheeting to that substrate.

SUMMARY

It is one feature of the present disclosure to provide a retroreflective traffic sign consisting of a polymeric film having a front face and a rear face having an optical pattern of microprismatic retroreflective elements integrally formed as part of such film, a pattern of walls formed of an adhesive defining cells formed on the aluminum substrate in which the microprismatic elements will be in the area defined by the cell walls, and the polymeric reflective sheet is adhered directly to such substrate.

It is another feature of the disclosure to provide a method for forming a retroreflective sign, such as a traffic sign, comprising passing a film having retroreflective elements on one side thereof past a station for applying a viscous polymer containing an adhesive in a pattern defining cell walls around areas of the retroreflective elements; then applying the film having the viscous polymer directly to an aluminum substrate and laminating the film to the substrate via the cell walls (meaning using the cell walls as the adhesive for lamination) while leaving the remaining retroreflective elements surrounded by air, and allowing the viscous material to cure while adhered to the substrate.

It is still a further feature of the disclosure to provide apparatus for producing a retroreflective traffic sign, including means for feeding a rigid substrate past a rotary screen having a pattern defining closed areas and open areas that will allow passage of a viscous adhesive containing polymer through the open areas of the screen onto the side of the substrate to provide walls defining cells surrounding predetermined areas on the substrate; means for laminating a thin retroreflective film with retroreflective elements onto the rigid substrate whereby a plurality of elements will be disposed within each of the cells defined on the substrate, to provide a sign needing only sign indicia, such as directional materials (lettering or symbols) to be applied to the front face of the film.

The technology presented herein is for a new composite sign, such as a traffic sign, and a process that permits one to laminate only a thin, retroreflective microprismatic film layer directly to large rigid panels, such as aluminum panels, without the backcoating, adhesive layer, and release liner as typically required. The combined materials now represent a finished fully functional traffic sign when cut or punched into the finished sign shape, and only the lettering or symbols need to be applied as is currently done.

In the case of an overhead guide sign, green or blue retroreflective micro prismatic film is laminated directly to large aluminum panels, typically 4'×8' in size (32 square feet), which are then joined together by spot welding or riveting to produce the entire larger background of the sign. Only the legend, text or symbols would have to be applied to the front face of the film. This product would be sold into sign shops, eliminating the need for one source of retroreflective sheeting and another source of aluminum and then combining the two components. It also eliminates the cost of the protective backing of the micro prismatic layer as well as the pressure sensitive adhesive and release liner. Therefore, in this new improved traffic sign product, the overall material costs are reduced, and even more importantly, the cost of labor to laminate the retroreflective sheeting component to the aluminum, is eliminated, thereby significantly reducing the total cost to the sign fabricator.

This could be done with all the primary colors for retroreflective sheeting, so when combined with the aluminum component this will allow the sign manufacturer to provide virtually every traffic sign shape and color. Because there are many types of microprismatic reflective sheeting (provided by different optics) identified in the ASTM D4956-13 specifications, one need only provide a thin microprismatic thin-film component in compliance with each specification, each to be laminated directly to an aluminum panel, thereby satisfying all of the industry needs. Sheets of the micro prismatic film layer laminated to aluminum panels can be shipped as large sheets stacked on skids to sign fabricators who can cut the panels to size and add the specific text and symbols as required. An embodiment of the product disclosed herein significantly reduces the overall cost to the sign fabricators, eliminating much, of their labor other than applying the specific front message on the sign.

In an embodiment, a retroreflective traffic sign consists of or comprises a polymeric film having a front face and a rear face and wherein portions of the rear face are adhered through a viscous polymeric adhesive to an aluminum substrate, wherein the rear face has a pattern of microprismatic retroreflective elements integrally formed as part of said film; a pattern of cell walls formed of an adhesive is on the substrate and in which some of the microprismatic retroreflective elements are in the cells; and the film is adhered directly to the cell walls formed on the substrate while leaving an air gap between the microprismatic retroreflective elements and the substrate in the cells.

In an embodiment, a method for forming a retroreflective traffic sign, comprises: passing a designated substrate material past a station; at the station, applying a viscous polymer containing an adhesive in a pattern defining cell walls on the substrate; laminating a thin polymeric sheet having retroreflective retroreflective elements on a back face thereof directly to the substrate having the cell walls; wherein the side of the substrate having the cell walls, the cell walls, and the thin polymeric sheet define an air gap; and allowing the adhesive material to cure while the film is adhered to said substrate. In an embodiment, the polyurethane is pre-formed in a pattern defining cell walls when applied to a front side of a rigid substrate.

In an embodiment, an apparatus for producing a retroreflective traffic sign, comprises: means for feeding a thin film having retroreflective elements on one side of the film past a rotary screen having a pattern defining closed areas and open areas that will allow passage of a viscous adhesive-containing polymer through the open areas of the screen onto the side of the film having the retroreflective elements thereon to provide walls defining cells surrounding predetermined areas of the retroreflective elements; means for feeding the film with the viscous polymer cell walls onto a substrate; and means for laminating the film to the substrate via said viscous polymer, wherein the traffic sign optionally includes drive related directions on the front face of the film.

In some aspects, the techniques described herein relate to a retroreflective sign including: a rigid substrate with a pattern of cell walls formed of a thermoplastic polyurethane, polyurethane adhesive or two-part polyurea adhesive, the cell walls defining cells; a polymeric sheet having a front face and a rear face, the rear face facing the rigid substrate face having the cell walls, the rear face including microprismatic reflective elements formed integrally on the polymeric sheet or on a separate layer coupled to the rear face of the polymeric sheet the polymeric sheet being adhered directly to the cell walls formed of the polyurethane adhesive or two part polyurea adhesive while leaving an air gap between the microprismatic retroreflective elements and the rigid substrate in the cells.

In some aspects, the techniques described herein relate to a method for forming a retroreflective sign, including: applying a polyurethane adhesive or two-part polyurea adhesive to a front side of a rigid substrate in a pattern defining cell walls; prior to full curing of the polyurethane adhesive or two-part polyurea adhesive, laminating the front side of the rigid substrate to a rear side of a polymeric sheet via the cell walls, the polymeric sheet including microprismatic elements, the rear side including microprismatic reflective elements formed integrally on the polymeric sheet or on a separate layer coupled to the rear side of the polymeric sheet; wherein the rear side of the polymeric sheet including the microprismatic elements, the front side of the rigid substrate, and the cell walls, define an air gap; and allowing the polyurethane adhesive or two-part polyurea adhesive to fully cure after adhering the polymeric sheet to the rigid substrate.

In some aspects, the techniques described herein relate to a method for forming a retroreflective sign, including: applying a thermoplastic polyurethane preformed in a pattern defining cell walls to a front side of a rigid substrate; heating the thermoplastic polyurethane to a temperature above its melting temperature, and laminating the front side of the rigid substrate to a rear side of a polymeric sheet via the cell walls, the rear side including microprismatic reflective elements formed integrally on the polymeric sheet or on a separate layer coupled to the rear side of the polymeric sheet wherein the rear side of the polymeric sheet including the microprismatic elements, the front side of the rigid substrate, and the cell walls, define an air gap.

In an embodiment, the adhesive cell walls are applied to the polymeric sheet and/or microprismatic elements on the polymeric sheet instead of the aluminum. The adhesive may comprise a polyurethane or two-part polyurea adhesive.

BRIEF DESCRIPTION OF THE DRAWINGS

FIG. 1 is a perspective view of a section of a traffic sign (without front face printing) produced in accordance with the present technology;

FIG. 2 is a partial enlarged sectional elevational view representative of the traffic sign panel of the current technology;

FIG. 3 is a plan view representative of one cell area of a type of microprisms that may be used in the traffic sign;

DETAILED DESCRIPTION

Figure 4:
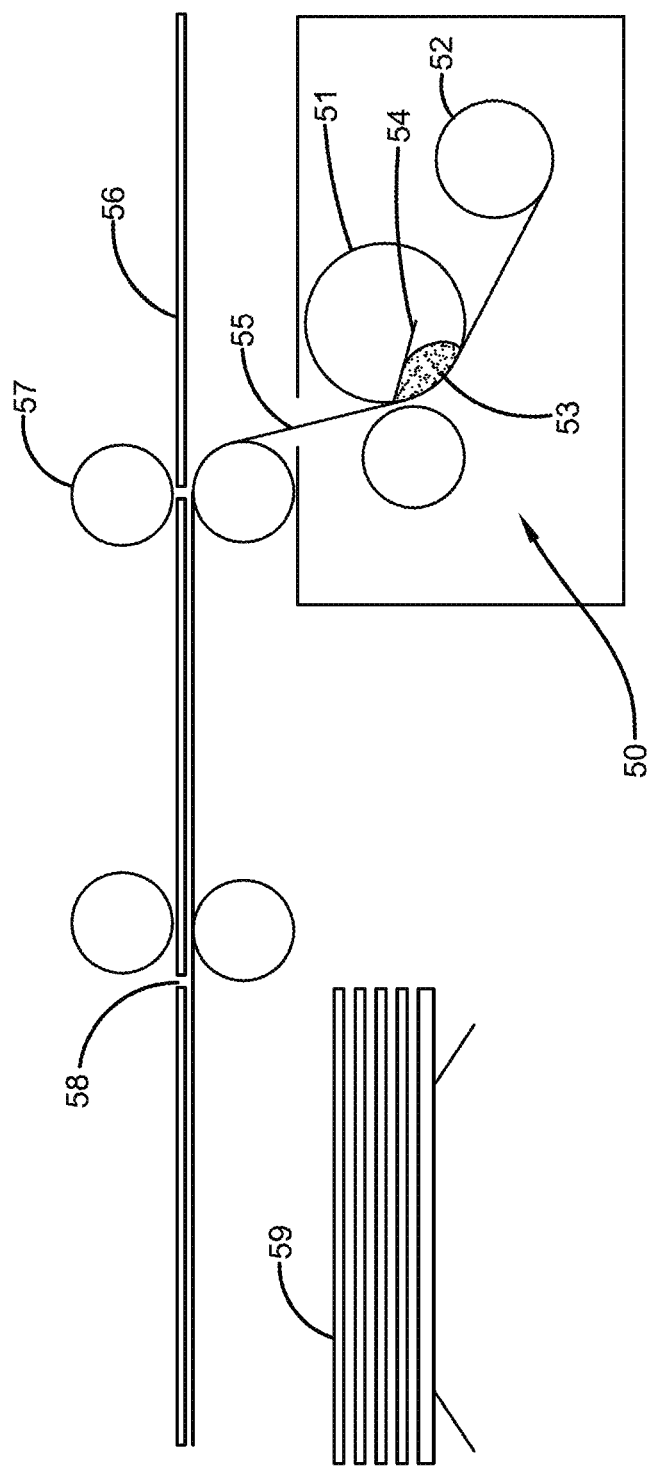
FIG. 4 is a schematic view of the apparatus and which shows the process of forming the novel traffic sign.

Referring now to FIG. 1, the retroreflective sign panel, designated 25, includes a microprismatic retroreflective film 26 that is a two layer thermoplastic material manufactured in accordance with processes disclosed herein. As herein shown, the microprismatic retroreflective film 26 has a front layer 27 with an obverse surface 28 and the rear or reverse surface 29 upon which is formed (preferably by embossing) a microprismatic type retroreflective pattern as illustrated in FIG. 3. For purposes hereof, the microprisms (often referred to as cube-corners or corner-cubes) may consist of different arrays of different elements, but the formation of the new traffic sign may include any of such precise microprisms. The thermoplastic web or microprismatic retroreflective film 26 may be on the order of about 0.006 inch (0.15 mm) in thickness, such as, for example, in the range of 0.005 to 0.01 inches (0.127 mm to 0.254 mm), or 0.006 to 0.009 (0.1524 mm to 0.2286 mm), depending on the depth of the prisms.

Referring to FIG. 3, the numeral 10 indicates generally a segment of a microprismatic type reflective thermoplastic web used in forming the laminate of the presently described technology. As seen in FIG. 3 there is depicted the rear surface of a portion of flexible retroreflective film 12 fashioned from transparent thermoplastic material in web form which has formed thereon, preferably by embossing, a retroreflective and repeating pattern of microprismatic reflector elements characterized by cube faces 14, 16 and 18. In an embodiment, the microprismatic reflective elements are formed integrally on the polymeric sheet (film).

In an aspect of the technology, the film 12 is formed from an impact modified acrylic having UV inhibitors or absorbers added thereto, and which, prior to embossing, had parallel front and back surfaces and was initially on the order of about 0.15 mm (0.006 inches) thick. One such material is known as Plexiglas DR 101, sold by Arkema Company.

The microprismatic pattern formed on sheeting 12 is formed in an optically precise finely detailed pattern as known in the art. For example, as seen in FIG. 2, the cube apex to groove of the microprismatic pattern as embossed into the film 12 (or as depicted as 26 in FIG. 1) may be on the order of 0.8 mm (0.00338 inch) (dimension X). As shown at dimension Y in FIG. 3 the prisms formed on sheet 12 may be spaced apart (meaning the distance Y is the distance across the prism in its greatest dimension) by a distance on the order of about 0.18 mm (0.0072 inch), such as 0.1 mm to 0.25 mm, or 0.15 mm to 0.23 mm, for the depth as shown at X. While the prism pattern shown in FIGS. 1 and 3 illustrates prisms each formed with their optical axis normal to the front face of film 12, it is to be understood that other versions and patterns may also be utilized as forming the retroreflective web of the laminate of the presently described technology. In an embodiment, the X dimension may, for example, be about 0.05 mm to about 2 mm, or 0.1 mm to 0.25 mm, or 0.15 mm to 0.23 mm, the precise value to be dependent on the depth of the prisms which in part relates to the optical design selected. In an embodiment, the Y dimension may vary depending on the optical design of the prisms.

Retroreflectivity is achieved by microprismatic type reflector elements primarily through the principle of total internal reflection. In order to best achieve this it is known in the art to provide an air gap between the prism apices and any substrate to which the film is attached. Thus for example, as shown in U.S. Pat. No. 5,930,041, which is incorporated herein by reference, cell walls around an array of microprisms are provided by sonic, e.g., ultrasonic, welding of a backing layer to the film; later an adhesive layer and a release liner are provided to the roll of welded film.

In accord with the present technology, no backing layer is needed to provide the air gap. In this case, a cell wall structure, generally at 42 (FIG. 1) provides discrete cells providing an air gap 34 between the microprismatic elements and an aluminum (or other material) substrate 32. For illustrative purposes only, the air gap in FIGS. 1 and 2 are represented by a dotted arrangement, it being understood that in actual formation there is no material in that space. Numeral 76 indicates a portion of the width of the air gap 34 wherein two peaks of microprismatic elements are present. In an embodiment, the cell walls formed from adhesive are coupled to the microprismatic elements. In an embodiment, the cell walls formed from adhesive preferably are disposed directly on the substrate to define a pattern thereon, as described more fully below. In such an embodiment, the cell walls formed from adhesive on the substrate are adhered to the microprismatic elements on the rear face of the thin film (polymeric sheet). In another embodiment, the cell walls formed from adhesive on the substrate are adhered to a unadorned portion of the rear face that is devoid of microprismatic elements. The pattern in the area defined by the resulting walls of the cells may vary depending upon the cell size and pattern area required for the amount of retroreflection needed. Typical examples of the pattern cell walls range from about 0.010 inch to about 0.020 inch (0.254 mm to 0.508 mm) in thickness (width), such as 0.3 mm to 0.5 mm, or 0.35 mm to 0.45 mm. The cell wall width will depend upon both the nature of the prism design and the amount of reflectivity required to meet the specifications.

Other possible alternatives to aluminum for the substrate are, sheet steel that has been powder coated or galvanized for outdoor applications, polymer composites such as layers of PEEK, polycarbonate, PMMA, or other combinations that would provide strength and rigidity, including recycled polymer combinations, recycled rubber-tire composites and other possible layers such as carbon fiber, fiberglass and wood composites that have been treated for outdoor use.

Figure 5:
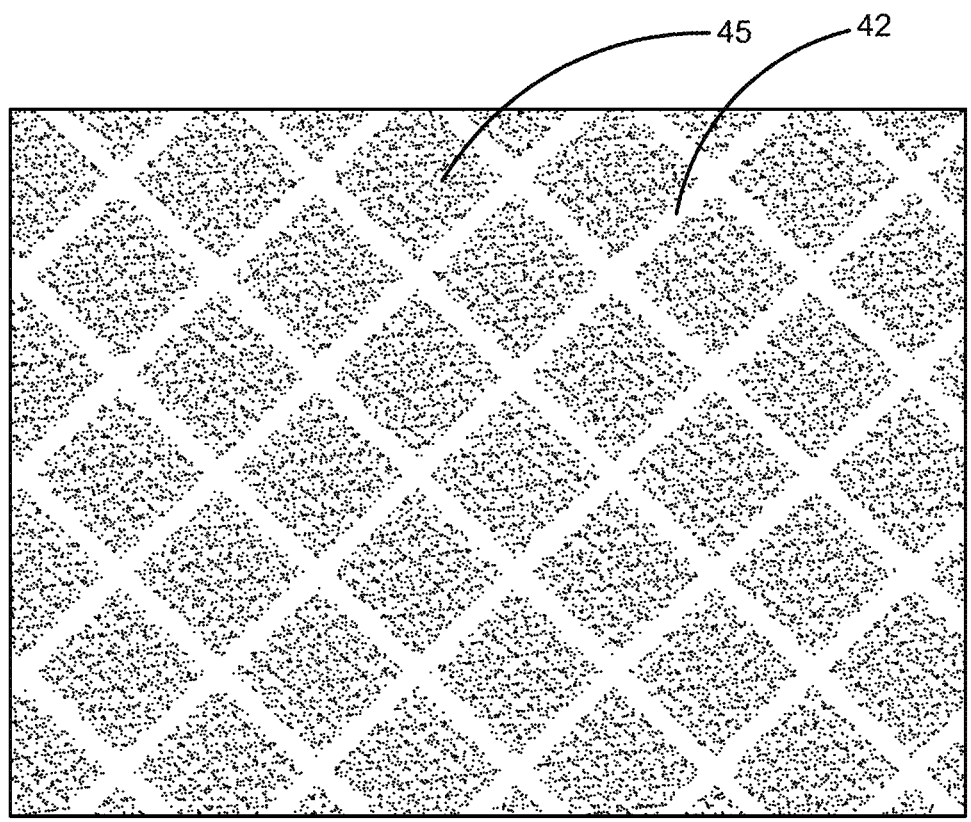
FIG. 5 is representative of a section of the rotary screen used to print the cell walls of the sign.
Figure 6:
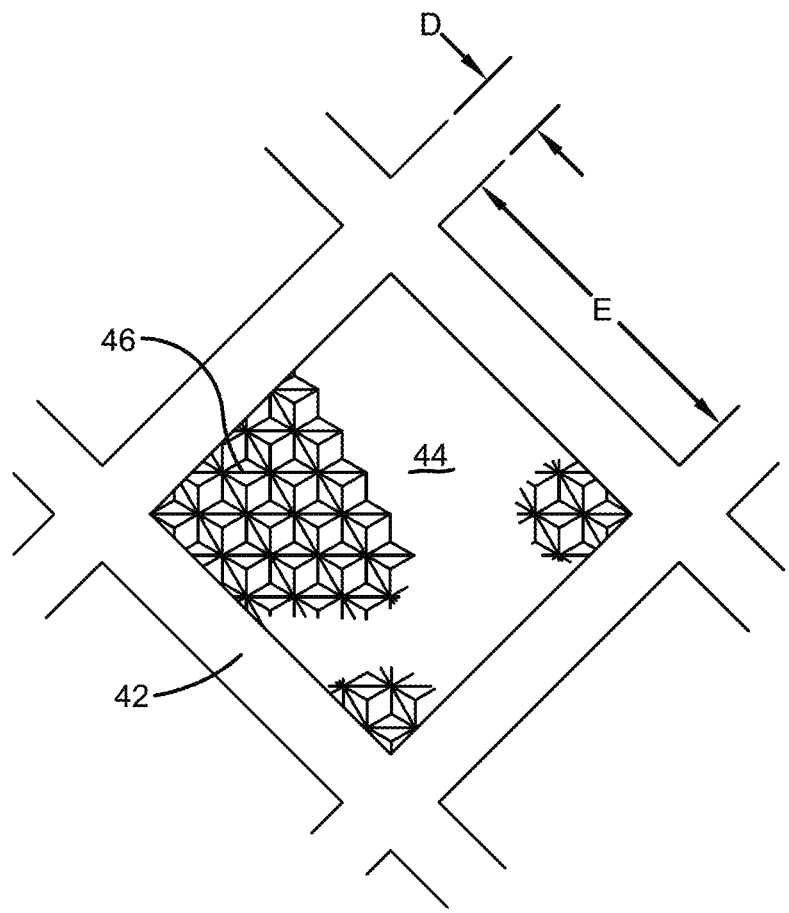
FIG. 6 is a greatly enlarged representative area of one size of cell defined by cell walls and encompassing a predetermined area of microprismatic elements.

Referring now to FIGS. 5 and 6, the numeral 40 indicates generally such a selected pattern. In the embodiment disclosed herein, each cell wall 42 represents polymeric adhesive on a facing surface of the substrate which will then be bonded to the rear (prismatic side) surface of the thermoplastic film (polymeric sheet) (FIG. 2, reference 26). Each cell with diamond shaped area 44 circumscribes an area that has a volume in the composite which comprises an air gap (FIG. 2, reference 34) between the microprismatic corner cube surfaces (FIG. 1, reference 29) and the aluminum backing 32. While this is described as film (e.g. as shown in FIG. 6), it is also representative of a section of the screen 51 (FIG. 4) through which a viscous polymer is applied, as hereinafter described. As best seen in FIG. 6, the actual percentage of area in which there is an air gap over the prismatic elements, is determined by the thickness or width of each cell wall 42, and the pattern selected for the air cell 44.

In the embodiment herein illustrated, each discrete air cell 44 has an area characterized by the dimension E in FIGS. 2 and 6 (since FIG. 6 shows a square air cell 44 the area of the air cell 44 is E squared). The dimension D is the thickness of the cell wall 42. As hereinabove described, the percentage of surface area available for retroreflectivity may be adjusted by changing the dimensions D and E as shown in FIGS. 2 and 6. Where, for example, as mentioned above, D is, for example, 0.015 inch (0.381 mm) and the dimension E is for example 0.200 inch (5.08 mm), the effective surface area of microprismatic elements available for retroreflection is about 84%. If dimension D is 0.027 inch (0.685 mm) and dimension E is 0.138 inch (3.50 mm), approximately 70% of the total surface of the resulting composite preserves retroreflective characteristics. With the dimension D of 0.029 inch (0.736 mm) and a dimension E of 0.096 inch (2.43 mm) than, approximately 55% of the total surface of the resulting composite retains retroreflective properties. In a preferred embodiment, dimension D is 0.030 inch (0.762 mm) and dimension E is 0.170 inch (4.31 mm) to give an effective area of reflection of about 73%.

In an embodiment, the dimension E may range from for example, about 0.01 to about 1 inch, about 0.1 to about 0.5 inches, or about 0.15 to about 0.35 inches. In an embodiment the effective area of reflection is about 50% to about 99%, such as 55% to about 90%, or about 60% to about 85%.

FIG. 4 shows, in schematic form, a preferred arrangement of equipment and sequence of operations to produce the retroreflective traffic sign composite of the type shown in FIG. 1.

The application of the adhesive cell wall 53 that is a viscous adhesive containing polymer (for purposes hereof, also generally referred to as a sealant), is applied directly via blade 54 to the microprismatic side of the microprismatic film 55 and then laminated at 57 to aluminum panels 56. The blade 54 is a flexible metal blade that is pushed against the metal screen to apply the adhesive containing polymer to the microprismatic film through pores in the screen. The viscous adhesive containing polymer, may, for example, have a viscosity of 250,000 cP to 100,000,000 cP, such as 1,000,000 to 8,000,000, or 3,000,000 to 5,000,000.

In an embodiment, the adhesive cell wall sealant 53 is applied by a rotary screen drum 51 in a diamond pattern with a cell size in the range of from about 0.096 inch (2.43 mm) to 0.300 inch (7.62 mm) and a wall width from about 0.010 inch (0.25 mm) to about 0.050 inch (1.27 mm). Variations in shape of the cells, the pattern repeat of the cells, and width of the cell walls 42 may be accomplished by changing the printing screen used on the screen printing drum 51. Also, the width of the film fed from roll 52 may be of various sizes, and the printing screens used will be of a compatible width.

Several preferred polymer formulations for the viscous adhesive cell wall sealant 53 have been identified that can be printed to form cell walls 42 that have adhesion to both the microprismatic retroreflective film (FIG. 1, reference 26) and the aluminum (or other metal) substrate 56 (the finished panel designates the substrate as numeral 32 in FIGS. 1 and 2).

The preferred material to print the adhesive cell wall sealant 53 that will have adhesion to the microprismatic retroreflective film 26 is a silicone rubber adhesive. Silicone rubber is an elastomer (rubber-like material) composed of silicone—itself a polymer—containing silicon together with carbon, hydrogen, and oxygen. Silicone rubbers are widely used in industry, and there are multiple formulations. Silicone rubbers are often one- or two-part polymers, and may contain fillers to improve properties or reduce cost. Silicone rubber is generally non-reactive, stable, and resistant to extreme environments and temperatures from −55° C. to +300° C. while still maintaining its useful properties.

Due to these properties and its ease of manufacturing and shaping, silicone rubber can be found in a wide variety of products, including: automotive applications; cooking, baking, and food storage products; apparel such as undergarments, sportswear, and footwear; electronics; medical devices and implants; and in home repair and hardware with products such as silicone sealants.

Typical physical properties for silicone rubber adhesives are as shown in the table below:
Mechanical Properties
  Hardness, shore A 10-90
  Tensile strength ~11 N/mm$^2$
  Elongation at break 100-1100%
  Maximum operational temperature +300° C.
  Minimum operational temperature −120° C.

One example of a silicone rubber sealant that can be printed to form cell walls 42 is a product such as Master Sil 713, available from MASTERBOND a low viscosity silicone adhesive/sealant that cures within an hour. It has a viscosity of 3,000 cps and exhibits a tensile strength of 125 psi and more than 200% elongation. Hardness is Shore A 30.

Alternatively, other adhesives that suitably function to bond the thin polymer reflective layer to the rigid backing sheet may be used that have the same or similar properties as the silicone adhesive mentioned above. One alternative to silicone is a water-borne polymeric systems consisting of acrylic/urethane copolymers.

High elongation at break, e.g., 100% to 1100%, or 200% to 500%, and low Shore A hardness, e.g., 10-90, or 20 to 60 are physical requirements for the sign, because an aspect of the solvent used to print the cell walls that bonds the reflective film to the aluminum backing is that it be flexible enough to compensate for the difference in coefficient of thermal expansion between the thermoplastic DR 101 reflective film, and the aluminum backing. The degree of flexibility, and the height and thickness of the cell wall required can be calculated allowing the cell wall to flex so that retroreflective film layer does not fracture during expansion or contraction of the aluminum backing.

In an embodiment, all of the properties of this construction will meet the requirements as specified in the test procedures for reflective sheeting in ASTM D4956-13, Standard Specification for Retroreflective Sheeting for Traffic Control.

As an example, paragraphs 6.9 and 7.5 of such Specification recite:

"6.9 Adhesion—When tested in accordance with 7.5, the adhesive backing of the retroreflective sheeting shall produce a bond that will support a 1¾-lb (0.79-kg) weight for adhesive classes 1, 2, and 3 or a 1-lb (0.45-kg) weight for adhesive class 4 for 5 min, without the bond peeling for a distance of more than 2 in. (51 mm)."

In this case because a separate adhesive backing is not used, adhesion is measured between the polymer microprismatic layer 29 and the aluminum substrate 32.

A preferred form of the apparatus to apply the adhesive cell wall sealant 53 is application station 50 consisting of a rotary screen printer manufactured by Stork Bragant BV of Boxmeer, Holland, of the type having a drum with an electroformed mesh screen 51. The screen 51 will have desired openings defining cell walls 42 and the areas 45 on the screen (FIG. 5) will be solid on the screen to define the open areas 44 for the air gaps (FIG. 6).

In an embodiment, the microprismatic retroreflective film 26 is provided on a roll 52.

The adhesive cell wall sealant 53 is pushed through the rotary screen 51 using a flexible stainless steel blade 54, printing the adhesive cell wall sealant as the desired pattern on the corner cube surface of the microprismatic film 55, which is then laminated to aluminum sheets 56 at a pressure of about 15-20 psi, using pressure rolls 57. The printing and lamination speed will be about 10 feet a minute. The microprismatic film will be laminated continuously to aluminum sheets 56 that are typically four feet wide by eight feet long.

According to the ASTM D4956-13 Standard Specification for Retroreflective Sheeting for Traffic Control, the typical aluminum sign blanks are made of 0.080 inch (2.03 mm) thick 6061-T6 aluminum. More recently it is believed that other metals have been used as the substrate. In an embodiment, the metal substrate may range from 0.05 to 0.75 inches in thickness, such as, for example, 0.07 to 0.5 in, or 0.075 to 0.01 in. For purposes hereof, the word "metal" as used in the claims is intended to cover aluminum (as the approved version) and any other approved metal substrate that meets ASTM D4956 specifications.

The combined retroreflective film and aluminum panels can be separated by cutting the retroreflective film between individual panels 58, so the panels can be stacked (as shown at reference 59) and allowed to finish curing.

In a further embodiment, which is a focus of this application, an improved method of combining the microprismatic reflective film disclosed herein to a substrate, in particular an aluminum substrate is provided. It was discovered that there is an advantage to printing some adhesives onto the aluminum rather than the film. Two-part polyurethane adhesives such as HERBERTS EPS877 from BOSTIK can be screen printed onto aluminum using a desired cell wall pattern then dried in an oven to initiate cure prior to being combined with the reflective prismatic film. Application of the adhesive to the aluminum and then drying said adhesive reduces or eliminates the risk of the microprismatic reflective film being adversely affected by high temperature encountered in the drying step. Polyurethane as used herein, includes materials generally called polyurethane and those more specifically called thermoplastic polyurethane. It was also discovered that a two-part polyurea adhesive, such as those used for lines on roads or parking lots can be applied and used in a same or similar manner as the polyurethane adhesive.

Once the solvent for the two-part polyurethane adhesive is removed by drying, the dry lamination adhesives on the aluminum can be bonded to the prismatic reflective film using a high-speed laminator with excellent print pattern aesthetics. Although dry and at ambient temperature, the adhesive is not fully cured, but will continue to crosslink until cured, achieving its highest bond strength over a 72 hour period. Despite the 72 hour time period for maximum bond strength, the product will be strong enough for use in 10 to 16, or 11 to 14 hours, or about 12 hours at 25° C. and 50% relative humidity.

In an embodiment, the adhesive is a two-part polyurethane adhesive that includes as a first part a polyol and isocyanate compound in a solvent, and as the second part, a crosslinker. The solvent for the two-part polyurethane adhesive is, for example, an amphiphilic solvent with relatively high volatility, such as acetone.

The polyol may, for example, have a solids content of 60% to 90%, such as 65% to 85%, or 68%. The polyol may, for example, have a viscosity of 500 to 1000 cP, such as 650 to 850 cP, or about 750 cP (each at 25° C.). Its density may be 0.95 to 1.1, such as 1.0 to 1.05, or about 1.04 g/mL.

In an embodiment, the crosslinking curing agent has a percent solids content of 60% to 90%, such as 65% to 85%, or 70%. It may have a specific gravity of 1.05 to 1.3, such as 1.07 to 1.2, or 1.1 to 1.15. The crosslinker may, for example, have a viscosity of 800 to 1500 cP, such as 900 to 1250 cP, or about 1100 cP (each at 25° C.). Its density may be 0.95 to 1.2, such as 1.0 to 1.1, or about 1.06 g/mL. The crosslinker can also be in a solvent, such as a polar solvent, e.g., ethyl acetate. The crosslinker may have isocyanate groups including one or both of aromatic and aliphatic diisocyanates, such as MDI (4, 4' diphenylmethane diisocyanate) and IPDI (Isophorone diisocyanate). The isocyanate content (NCO %) may be, for example, 9% to 14%, such as 10% to 13%, or 11% to 12%, or 11.5%.

For certain embodiments, a medium cure rate is desired. A fast cure rate will leave an overly cured adhesive before the prism layer can be adhered, and a slow cure rate will be inefficient and potentially lead to manufacturing difficulties. In an embodiment, the mixed two-part polyurethane adhesive has a pot-life (the time it takes the mixed composition to double in viscosity after first mixing) of 18 to 36 hours, such as 20 to 30 hours, or about 24 hours, at 25° C. and 50% relative humidity. Timing the mixing and application of the adhesive with the cure rate should be properly performed in the method disclosed herein. In an embodiment, the adhesive is mixed and still sufficiently uncured and low enough in viscosity to be screen printed through a screen mesh onto the substrate. In an embodiment, this is within the pot-life. However, the polyurethane adhesive should have sufficient viscosity and cure when applied to the substrate to maintain a height on the substrate that allows for the air gap between the substrate and the polymeric sheet when the polymeric sheet is laminated onto the substrate.

In an embodiment, the mix ratio for polyol to cross-linker, such as, HERBERTS ESP877 polyol to BOSCODUR 1621 isocynate cross-linker is 100:5 to 100:20, or 100:7 to 100:15, or 100:8 to 100:12, or 100:9. The mixed adhesive compound can be processed at a solids content of 30% to 60%, such as 35% to 45%, or 40% to 45%. Solvent can be added to further dilute the mixed composition. Polyurethane grade solvents with less than 0.1% water content can be used, e.g., ethyl acetate, acetone, or Methyl ethyl ketone or a mixture thereof.

In an embodiment, curing is activated or catalyzed with heat, the minimum temperature to initiate cure is 151° F. However, higher temperatures can be used, such as 151° F. to 180° F., or 155° F. to 175° F., or 169° F. In an embodiment, the two-part polyurethane adhesive continues to cure when laminated between two substrates without the presence of air or moisture. This is a distinction from most other adhesives.

Flexible polyurethanes typically result from a lower molecular weight polyol with a Mw of 2,000 g/mol or less, such as 50 to 1,800 g/mol or 100 to 1,500 g/mol. More rigid polyurethanes can result from polyols with molecular weights exceeding 2,000 g/mol up to 10,000 g/mol. In an embodiment, the polyurethane adhesive is a flexible polyurethane resulting from a polyol with a molecular weight of 2,000 g/mol or less.

Other adhesives that can be printed on aluminum and dried before lamination are thermoplastic urethane formulations (TPU formulations). Aliphatic thermoplastic urethanes can be formulated to bond at temperatures as low as 160° F. with high adhesion to most substrates. Aliphatic thermoplastic urethanes are UV stable and therefore extremely durable for outdoor applications and very soft to ensure good die-cutting of the prismatic reflective film and aluminum laminate. TPU formulations that are commercially available include: Hot Melt Adhesives (HMAs), and Reactive Hot Melts Adhesives (HMAs) and Hot Melt Polyurethane Reactives (HMPUR). Pearlbond™ TPU (Thermoplastic Polyurethane) from Lubrizol is one example.

In an embodiment, the TPU would be dissolved in a solvent or dissolved as an aqueous solution and screen printed onto the aluminum substrate as with the two-part polyurethane composition disclosed above. In an embodiment, the TPU is an aliphatic TPU, and not aromatic.

As an alternative to laminating the dry TPU with hot rolls, the TPU could be bonded to the microprismatic reflective film by using continuous ultrasonic welding, such as that used to bond polymer films and nonwovens. The advantage of ultrasonic welding is the heat energy is focused through the cell walls between the aluminum and the microprismatic reflective film. Ultrasonic welding of polymers typically causes local melting of the polymeric material (e.g., thermoplastic) due to absorption of vibrational energy along the joint to be welded. In metals, ultrasonic welding induces high-pressure dispersion of surface oxides and local motion of the materials. Although heating occurs, it is not enough to melt metal materials.

Figure 7:
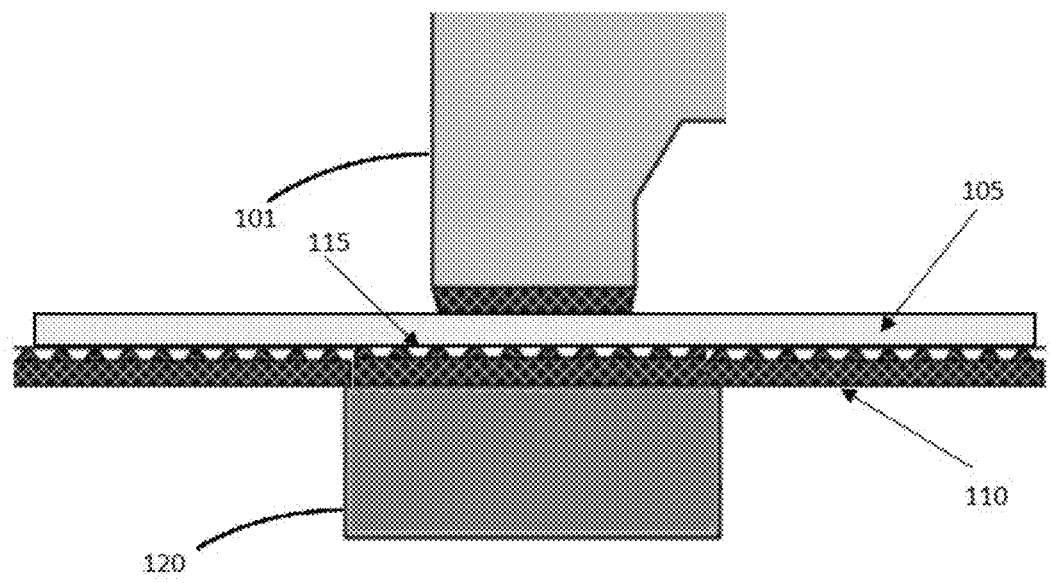
FIG. 7 is a cross-sectional view of a sonic welding apparatus.

FIG. 7 depicts a sonic welding apparatus for welding the microprismatic reflective film 105 to an aluminum sheet with printed cell walls 110. The film is welded at an interface 115 as the ultrasonic energy is applied by the sonic horn 101 juxtaposed over an anvil 120.

Yet another method to bond microprismatic reflective film to an aluminum substrate forming cell wall is with TPU (thermoplastic polyurethane) netting. TPU netting can be custom made to a particular pattern. The netting can be provided in rolls and laminated to bond the microprismatic reflective film to aluminum at low temperatures (165° F.) that eliminates the risk of the microprismatic reflective film from being adversely affected by high temperature. During or just before laminating the netting is at least partially melted by heating the netting just above its melting temperature. The netting forms the cell walls of the sign. The netting is formed of a Hot Melt Adhesive and is an alternative to the screen printed two-part adhesive. It bonds as soon as it cools. There is no solvent involved that needs to be dried. It cures quickly, e.g., within 5, 3, or two minutes after lamination and does not require the long cure time of other adhesives. This provides a product that has no VOCs, is environmentally friendly, and sustainable.

Another method to bond microprismatic reflective film to an aluminum substrate forming cell walls is by using a two part polyurea coating such as EPOPLEX® LS 90 manufactured by Epoplex, Maple Shade N.J. In an embodiment, the two-part polyurea coating has 100% solids chemistry, a low viscosity suitable for digital printing, screen printing or spray application, excellent bond strength (greater than 300 psi per ASTMD-7234) assuring good adhesion to aluminum and most polymer substrates, formulation chemistry for fast set at a wide range of temperatures, and 100% ultraviolet light stability. In an embodiment, the two-part polyurea has a drying time at 25° C. of 4 to 15 minutes, such as 5 to 12 minutes, or 7 to 10 minutes. This may be determined by ASTM D-711 with glass beads. In an embodiment, drying time, viscosity, and applied volume should be sufficient for the applied adhesive to dry and form a height above the substrate of 5 to 10 mils, such as 6 to 9 or 7 to 10 mils. Other properties not mentioned for the polyurea adhesive may be the same or similar to the polyurethane adhesive mentioned above.

In an embodiment, the two-part polyurea is applied with two nozzles directed at a same area, the first and second nozzles supplied by the first and second components, respectively. Alternatively, the two parts can be combined and/or mixed just prior to application by a single nozzle.

The first part of the polyurea coating includes an amine and the second includes an isocyanate. In an embodiment these are mixed in first to second ratio of 4:1 to 1:1, such as 3:1 to 1.1:1, or 2.1:1 to 1.9 to 1, including a 2:1 ratio. White pigment may be present, up to 20% by weight of the total composition, e.g., 1 to 10%, or 5 to 15% by weight.

In an embodiment, the two-part polyurea coating could be applied using a digital printer to either the aluminum or the microprismatic reflective film and then laminated to the other substrate. In an embodiment, heat is not required for full cure, nor is air or moisture. In an embodiment curing is induced by chemical additives (cure agents) in the composition. Another alternative is to mask the microprismatic reflective layer or film on the side to be bonded to the aluminum by printing a variety of masking materials over the reflective layer or film that will leave only the areas for the cell walls exposed. The masking materials for the microprismatic reflective film include silica powder, Ti02, talc or other materials that could be printed as a slurry and then dried. Masking materials for the microprismatic reflective film would have to be extremely small in particle size such as explained in U.S. Pat. No. 4,672,089, incorporated herein by reference. With the dried masking in place the two-part polyurea coating could be spray coated on the aluminum or the microprismatic reflective film and then the two substrates laminated, allowing the cell walls to bond the two substrates together.

Surprisingly, a dried mask layer of hydrophobic silica with sufficiently small particle size remains in place and only slightly affects the reflectivity of the material. Sufficiently small primary particle size of the silica may be, for example, 5 to 30 nanometers, such as 10 to 25 nm, or 15 to 20 nm. The agglomerated particle size of the hydrophobic silica in its final form is about 5 microns. However, it will be understood that the only critical limitation on the particle size is such that the area in which it is deposited will be substantially impervious to the backcoating material 32, whereby the backcoating material is unable to penetrate the hydrophobic silica and interact with the cube-corner pattern except in those areas devoid of the silica.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Furthermore, to the extent that the term "includes" is used in either the detailed description or the claims, such term is intended to be inclusive in a manner similar to the term "comprising" as "comprising" is interpreted when employed as a transitional word in a claim. The term "consisting essentially" as used herein means the specified materials or steps and those that do not materially affect the basic and novel characteristics of the material or method. If not specified above, any properties or measurements mentioned herein may be determined by applicable ASTM standards, or if an ASTM standard does not exist for the property, the most commonly used standard known by those of skill in the art may be used. The articles "a," "an," and "the," should be interpreted to mean "one or more" unless the context indicates the contrary.

What is claimed is:

1. A layered material comprising:
   a rigid substrate with a pattern of cell walls formed of a thermoplastic or adhesive, the cell walls defining cells; and
   a polymeric sheet having a front face and a rear face, the rear face facing the rigid substrate face having the cell walls, the rear face comprising reflective elements formed integrally on the polymeric sheet or on a separate layer coupled to the rear face of the polymeric sheet;
   the polymeric sheet being adhered directly to the cell walls formed of the thermoplastic or adhesive while leaving an air gap between the reflective elements and the rigid substrate in the cells;
   wherein the adhesive is a two-part polyurethane adhesive.

2. The layered material of claim 1, wherein the adhesive has a viscosity in a range from 500 cP to 1000 cP at 25° C.

3. The layered material of claim 1, wherein the substrate includes at least one of aluminum, powder coated steel, galvanized steel, PEEK, polycarbonate, PMMA, recycled tire rubber composites, carbon fiber, fiberglass, or wood composites treated for outdoor use.

4. The layered material of claim 1, wherein the layered material meets or exceeds requirements of ASTM D4956-13 standard.

5. The layered material of claim 1, further includes indicia.

6. The layered material of claim 1, wherein the adhesive is a polyurethane adhesive that comprises groups derived from both an aromatic diisocynate and an aliphatic diisocyanate.

7. The layered material of claim 1, wherein a height of the thermoplastic or adhesive is in a range from 5 mils to 10 mils.

8. A layered material comprising:
   a rigid substrate with a pattern of cell walls formed of a thermoplastic or adhesive, the cell walls defining cells; and
   a polymeric sheet having a front face and a rear face, the rear face facing the rigid substrate face having the cell walls, the rear face comprising reflective elements formed integrally on the polymeric sheet or on a separate layer coupled to the rear face of the polymeric sheet;
   the polymeric sheet being adhered directly to the cell walls formed of the thermoplastic or adhesive while leaving an air gap between the reflective elements and the rigid substrate in the cells;
   wherein the adhesive is a two-part polyurethane adhesive that includes, as a first part, a polyol and isocyanate compound in a solvent, and, as a second part, a crosslinker; wherein a ratio of polyol to crosslinker is in a range from 100:5 to 100:20.

9. The layered material of claim 8, wherein the adhesive has a viscosity in a range from 500 cP to 1000 cP at 25° C.

10. The layered material of claim 8, wherein the substrate includes at least one of aluminum, powder coated steel, galvanized steel, PEEK, polycarbonate, PMMA, recycled tire rubber composites, carbon fiber, fiberglass, or wood composites treated for outdoor use.

11. The layered material of claim 8, further including indicia.

12. The layered material of claim 8, wherein a height of the thermoplastic or adhesive is in a range from 5 mils to 10 mils.

13. A method for forming a layered material, the method comprising:
   applying an adhesive to a front side of a rigid substrate in a pattern defining cell walls; and
   prior to full curing of the adhesive, laminating the front side of the rigid substrate to a rear side of a polymeric sheet via the cell walls, the polymeric sheet comprising reflective elements, the rear side comprising reflective elements formed integrally on the polymeric sheet or on a separate layer coupled to the rear side of the polymeric sheet;
   wherein the rear side of the polymeric sheet comprising the reflective elements, the front side of the rigid substrate, and the cell walls, define an air gap; and
   allowing the adhesive to fully cure after adhering the polymeric sheet to the rigid substrate;
   wherein the adhesive is two-part polyurea adhesive, wherein a first part includes an amine and second part includes an isocyanate, and wherein the first part and the second part are in a ratio in a range from 4:1 to 1:1.

14. The method of claim 13, wherein the full curing occurs in a duration from 10 hours to 72 hours at a relative humidity range of 25° C. to 50%.

15. The method of claim 13, wherein the adhesive is applied after partially masking the rear side of the polymeric sheet and leaving areas for cell walls unmasked for application of the two-part polyurea adhesive thereon.

16. A method for forming a layered material, comprising:
   applying an adhesive to a front side of a rigid substrate in a pattern defining cell walls;
   prior to full curing of the adhesive, laminating the front side of the rigid substrate to a rear side of a polymeric sheet via the cell walls, the polymeric sheet comprising reflective elements, the rear side comprising reflective elements formed integrally on the polymeric sheet or on a separate layer coupled to the rear side of the polymeric sheet;
   wherein the rear side of the polymeric sheet comprising the reflective elements, the front side of the rigid substrate, and the cell walls, define an air gap; and
   allowing the adhesive to fully cure after adhering the polymeric sheet to the rigid substrate;
   wherein the adhesive is a two-part polyurethane adhesive that includes as a first part a polyol and isocyanate compound in a solvent, and as a second part, a crosslinker.

17. The method of claim 16, wherein the polyol has a solids content in a range from 60% to 90%.

18. The method of claim 17, wherein the crosslinker has a percent solids content in a range from 60% to 90%.

19. The method of claim 18, wherein the crosslinker has isocyanate groups including one or both of aromatic and aliphatic diisocyanates.

20. The method of claim 16, wherein the two-part polyurethane adhesive doubles in viscosity in for a duration of 18 hours to 36 hours after first mixing the first part and second part, at a range of relative humidity between 25° C. and 50%.

* * * * *